(12) United States Patent
Knight et al.

(10) Patent No.: US 10,150,834 B2
(45) Date of Patent: Dec. 11, 2018

(54) METHOD FOR MAKING AN ELECTRICAL CABLE JOINT

(71) Applicant: DOW GLOBAL TECHNOLOGIES LLC, Midland, MI (US)

(72) Inventors: Nicole Knight, Rosharon, TX (US); Dwight Latham, Clute, TX (US); Nathan Wilmot, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 201 days.

(21) Appl. No.: 14/915,058

(22) PCT Filed: Aug. 16, 2014

(86) PCT No.: PCT/US2014/051388
§ 371 (c)(1),
(2) Date: Feb. 26, 2016

(87) PCT Pub. No.: WO2015/047584
PCT Pub. Date: Apr. 2, 2015

(65) Prior Publication Data
US 2016/0204584 A1    Jul. 14, 2016

Related U.S. Application Data

(60) Provisional application No. 61/883,299, filed on Sep. 27, 2013.

(51) Int. Cl.
*H02G 1/14* (2006.01)
*C08G 61/12* (2006.01)
(Continued)

(52) U.S. Cl.
CPC ............... *C08G 61/12* (2013.01); *H02G 1/14* (2013.01); *H02G 15/003* (2013.01);
(Continued)

(58) Field of Classification Search
CPC ........ C08G 2261/135; C08G 2261/334; C08G 2261/42; C08G 2261/76; C08G 61/12; C09K 3/1006; H02G 15/003
See application file for complete search history.

(56) References Cited

U.S. PATENT DOCUMENTS 3,783,177 A * 1/1974 Kelso ................. H01R 4/22
                                                           174/87
4,804,715 A    2/1989 Leonard
(Continued)

FOREIGN PATENT DOCUMENTS

| EP | 1435383 A | 7/2004 |
| EP | 1970408 A | 9/2008 |
| FR | 1342582 A | 12/1962 |

*Primary Examiner* — Minh Trinh

(57) ABSTRACT

A method for making joints in an electrical cable is disclosed. A first cable having polymeric insulation and a first bare conductor end and a second cable having polymeric insulation and a second bare conductor end are provided and joined create a conductor joint. A curable reaction mixture is applied over the conductor joint and cured to form a polymeric insulating sheath over the conductor joint and bonded to the polymeric insulation of each of the first and second cables. The reaction mixture includes a carbon-Michael acceptor compound, a carbon-Michael donor compound and a carbon-Michael reaction catalyst.

13 Claims, 1 Drawing Sheet

(51) Int. Cl.
*H02G 15/00* (2006.01)
*H02G 15/08* (2006.01)
*C09K 3/10* (2006.01)

(52) U.S. Cl.
CPC ....... *H02G 15/08* (2013.01); *C08G 2261/135* (2013.01); *C08G 2261/334* (2013.01); *C08G 2261/42* (2013.01); *C08G 2261/76* (2013.01); *C09K 3/1006* (2013.01)

(56) References Cited

U.S. PATENT DOCUMENTS

| | | | |
|---|---|---|---|
| 4,871,822 A | | 10/1989 | Brindopke |
| 5,132,367 A | | 7/1992 | Chan |
| 5,232,996 A | * | 8/1993 | Shah ................ C09J 163/00 525/452 |
| 5,567,761 A | | 10/1996 | Song |
| 6,204,343 B1 | | 3/2001 | Barucha |
| RE37,340 E | * | 8/2001 | King, Jr. ................ H01R 4/22 174/87 |
| 7,396,429 B2 | * | 7/2008 | Beckley ................ C08G 61/12 156/275.7 |
| 9,758,615 B2 | * | 9/2017 | Heath ................ C08G 59/14 |
| 9,796,895 B2 | * | 10/2017 | Jin ................ C08J 9/14 |
| 9,831,654 B2 | * | 11/2017 | Zantout ................ H02G 15/043 |
| 2015/0299510 A1 | * | 10/2015 | Knight ................ C09K 3/1012 427/386 |
| 2016/0204584 A1 | * | 7/2016 | Knight ................ C08G 61/12 29/869 |

\* cited by examiner

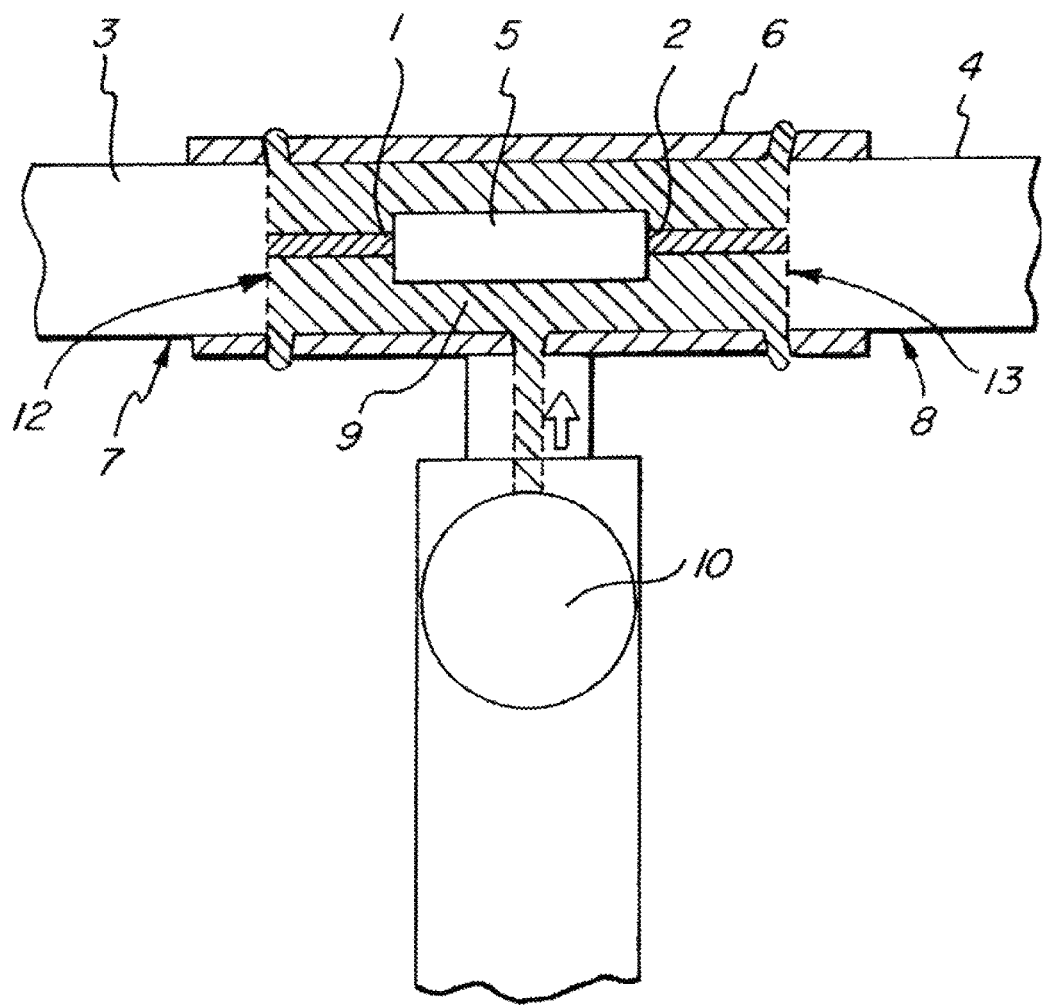

METHOD FOR MAKING AN ELECTRICAL CABLE JOINT

This invention relates to a non-isocyanate sealant for cable joining and to a method of joining electrical cables.

When electrical cables are joined, it is necessary to repair the electrical insulation around the joint. One common way of accomplishing this is to encapsulate the joint in an organic resin. The molded resin forms a sheath around the joint and bonds to the polymeric electrical insulation of the cables. This forms a continuous seal that not only provides electrical insulation, but also protects against the intrusion of humidity and liquids such as water.

The organic resin needs to meet several criteria. When cured, it must adhere well to the cable insulation. The bond between the cured resin and the cable insulation needs to be impervious to liquids and moisture and have good hydrolytic stability. The bond needs to be long-lasting, as the joined cable may be in operation for many years in locations where it is not easily accessible for repair. The cured resin also must be a good electrical insulator. The cured resin must be resistant to breakdown in the presence of an electrical field produced by the current passing through the cable.

Processing characteristics are also important attributes for the curable organic resin. Cable splicing is frequently performed in the field, i.e., at the point of use of the cable. In addition, the amount of organic resin needed to make a particular splice is sometimes quite small, on the order of a kilogram or less, although in some cases these amounts can be quite substantial, up to 30 liters or more in volume. These considerations dictate that the curable polymer system be capable of application using simple methods. Complex polymer processing equipment usually is not available in these in-field locations, and in any event often is not adapted very well for managing small volumes of material. Another consideration due to in-field application is that heating equipment is usually not available. This means that the curable organic resin must be capable of application and curing at whatever temperature may be present at the application site, without additional applied heating.

The curable organic resins systems used in these cable joining applications typically include two liquid components that are mixed, applied to the cable joint and then cured to form a sheath about the joint. The liquid components should be low to moderate in viscosity so they can be mixed and applied easily. The mixed components need to have a pot life of several minutes or more to allow time to complete the mixing and the application of the mixture onto the joint. After the reaction mixture is applied to the joint, it should cure reasonably quickly to form a polymer that bonds strongly to the cable insulation.

To date, two-component polyurethane and two-component epoxy resins systems have mainly been used for this application. The polyurethane systems work very satisfactorily, but there are potential worker exposure concerns if polyisocyanate compounds are not handled properly. In addition, polyisocyanates can react with water to produce carbon dioxide, which can lead to foaming. This can be a serious problem in in-field applications, as the material is often exposed to water or humidity as it cures. Exposure even to atmospheric moisture alone is often sufficient to cause foaming, which leads to a loss of electrical insulation properties, and also can form pores in the material though which water and other fluids can penetrate.

Epoxy resin systems suffer from two main problems. First, they tend to be too rigid and brittle to be entirely satisfactory. A second problem is that the curing reaction tends to be highly exothermic. The released heat of reaction causes a large temperature increase. In many cases, the temperature increase is enough to damage the cable. That damage leads to defects in the insulation.

Therefore, it would be desirable to provide an isocyanate-free curable resin system for joining cables, which has a good pot life, which cures at room temperature or even somewhat lower temperatures, without the application of additional heat, which is not highly exothermic, and which cures to form a polymer having low electrical permittivity, resists breakdown in the presence of an electrical field, and which forms a good bond to the polymeric insulation used in electric cables.

This invention is in one aspect a method for making a cable joint, comprising the steps of:
 a) joining a first bare conductor end of a first cable having a polymeric insulation to a second bare conductor end of a second cable having a polymeric insulation to create a conductor joint,
 b) applying a curable reaction mixture over the conductor joint and in contact with the polymeric insulation of the first cable and the polymeric insulation of the second cable and
 c) curing the curable reaction mixture to form a polymeric insulating sheath over the conductor joint and bonded to the polymeric insulation of each of the first and second cables;
 wherein the curable reaction mixture contains 1) at least one multifunctional carbon-Michael acceptor compound, wherein at least one of such multifunctional carbon-Michael acceptor compounds contains two or more carbon-Michael acceptor groups, at least one of which is separated from each of the other carbon-Michael acceptor groups by an aliphatic polyether group having a molecular weight of at least 800 atomic mass units, 2) at least one multifunctional carbon-Michael donor compound and 3) at least one carbon-Michael reaction catalyst.

This invention provides a readily-processable thermosetting, elastomeric joining composition for cable joining. The joining composition does not require the presence of isocyanate compounds. When the Michael donor and acceptor are mixed, they can cure spontaneously at room temperature or even somewhat lower temperatures and therefore can be used without application of heat. The cured composition forms a strong elastomeric sheath which bonds strongly to polymeric cable insulation and which exhibits useful electrical properties and low permeability to gases and liquids.

BRIEF DESCRIPTION OF THE DRAWING

The FIGURE is a cable joint, partially in section as it is being formed by the method of the present invention.

The electrical cables to be joined in accordance with the invention include one or more conductors (wires) and a polymeric electrical insulation surrounding the conductors. Typically the conductors are individually insulated, and in the case of a multiwire cable, the individually-insulated wires are typically sheathed in another polymeric insulator. The polymeric insulator may be, for example, neoprene, polyethylene, ethylene propylene rubber, ethylene propylene diene rubber, a chlorosulfonated polyethylene, another type of polyolefin, polyvinylchloride, a nitrile rubber such as a polymer or copolymer of acrylonitrile, a diene rubber such as a polymer or copolymer of butadiene, a polyurethane, and the like. The conductors are typically metals such as copper, aluminum and steel. The conductor size range may be, for example, from AWG (American Wire Gauge) 40 (about 0.0799 mm diameter) to 4/0 (about 11.684 mm diameter).

The cable joint is made by joining a bare (i.e., uninsulated) conductor end of a first cable to a bare conductor end of a second cable to create a conductor joint. If multiwire cables are to be joined, then each of the conductors of each of the cables is joined in similar manner. Electrical tape or other insulation is optionally applied over the individual splices. Similarly, if more than two cables are to be joined, the conductors of all the cables are joined as necessary for the particular wiring protocol, including, if necessary, applying electrical tape or other insulation over the individual splices. Then a curable reaction mixture is applied over the conductor joint and in contact with the polymeric insulation of the first cable and the second cable. The curable reaction mixture is cured to form a polymeric insulating sheath over the conductor joint and bonded to the polymeric insulation of each of the first and second cables.

It is often convenient to perform the applying and curing steps in a mold, by which it is meant any device that holds the reaction mixture in place until it cures. A mold may be a one-piece or two-piece type adapted to fit over a cable conductor joint. A typical mold is designed at its ends to fit tightly around the cables when the mold is closed. Alternatively, the ends of the mold can be blocked off using tape or other means to prevent the reaction mixture from leaking out before it cures. Such a mold typically has a larger cross-section central region that forms a reservoir encompassing the cable joint, and has an opening for introducing the curable reaction mixture into the reservoir. An example of such a mold is that marketed by 3M United Kingdom PLC in its Scotchcast™ Flexible Power Cable Jointing Kits, 82-F and 82-BF series. In certain embodiments, the mold is positioned over the cable joint and the curable reaction mixture is poured into and cured in the mold.

Curing can be performed by forming the reaction mixture at a temperature of, for example, −10° C. to 50° C., and allowing the components to react. It is not necessary to apply additional heat to the reaction mixture, although that can be done if a rapid cure is wanted. It is preferred to form the reaction mixture at a temperature of 0 to 35° C., especially 10 to 30° C., and to allow the reactants to cure without additional applied heat. The curing reaction is usually exothermic, and the exothermic heat of reaction may increase the temperature of the reaction mixture as it cures.

Turning to the FIGURE, first bare conductor end 1 of first cable 3 is joined to second bare conductor end 2 of second cable 4. First cable 3 has polymeric insulation 7 and second cable 4 has polymeric insulation 8. First bare conductor end 1 and second bare conductor 2 are joined at conductor joint 5. Conductor joint 5 is disposed within mold 6, which is large enough to encompass the insulated end of each of first cable 3 and second cable 4. Curable reaction mixture 9 is applied from source 10 into mold 6 over conductor joint 5 and into contact with polymeric insulation 7 of first cable 3 (at interface 12) and polymeric insulation 8 of second cable 4 (at interface 13). Upon curing, curable reaction mixture 9 forms a polymeric insulating sheath over conductor joint 5. The polymeric insulating sheath is bonded to polymeric insulation 7 and polymeric insulation 8.

The curable reaction mixture contains at least one multifunctional carbon-Michael acceptor compound as described before, at least one multifunctional carbon-Michael donor and at least one carbon-Michael reaction catalyst.

For purposes of this invention, a "multifunctional carbon-Michael acceptor" is a compound that has multiple carbon-Michael acceptor functionalities per molecule. By "carbon-Michael acceptor functionality", it is meant an aliphatic carbon-carbon double or triple bond alpha to an electron withdrawing group. The electron-withdrawing group may be, for example, a carbonyl (in which case the acceptor is sometimes referred to as an "enone" group), a nitro group or a nitrile group. A multifunctional carbon-Michael acceptor has at least two, preferably 2 to 10, more preferably 2 to 6 and still more preferably 2 to 4 carbon-Michael acceptor functionalities. The preferred enone-containing carbon-Michael acceptors include compounds containing two or more (meth)acrylic groups, i.e., two or more (meth)acrylate or (meth)acrylamide groups.

The multifunctional carbon-Michael acceptor compound contains at least one high equivalent weight carbon-Michael acceptor compound in which at least one of the carbon-Michael acceptor groups is separated from each of the other carbon-Michael acceptor groups by an aliphatic polyether group of at least 800 atomic mass units. Preferably, at least one of the carbon-Michael acceptor groups is separated from each of the other carbon-Michael acceptor groups by an aliphatic polyether group of at least 1000, more preferably at least 2000, atomic mass units. This compound or compounds may constitute at least 25%, at least 50%, at least 75%, or at least 85%, of the total weight of all multifunctional carbon-Michael acceptor compounds provided to the reaction mixture. This compound or compounds may constitute up to 100% or up to 90% by weight of all multifunctional carbon-Michael acceptor compounds provided to the reaction mixture.

The aliphatic polyether group may be, for example, a polymer of ethylene oxide, 1,2-propylene oxide, 1,2-butylene oxide, 2,3-butylene oxide, tetramethylene oxide, and the like. An especially preferred aliphatic polyether group contains a poly(1,2-propylene oxide) chain or a random propylene oxide-co-ethylene oxide chain which contains up to 40%, preferably up to 25%, more preferably up to about 15%, by weight copolymerized ethylene oxide. Such especially preferred spacer groups may have terminal poly (ethylene oxide) segments, provided that such segments should not in the aggregate constitute more than 40%, preferably not more than 25% and more preferably not more than 15% of the total weight of the polyether chain. The weight of the aliphatic polyether group includes the residue of any initiator compound used to make the aliphatic polyether.

There are several approaches to making the high equivalent weight multifunctional carbon-Michael acceptor compound. One approach involves capping the hydroxyl groups of a polyether polyol with an acrylate or methacrylate compound (a "(meth)acrylate compound") that also has a functional group that reacts with a hydroxyl group to form a bond to the end of the polyether chain. Examples of such capping compounds include acrylate-containing isocyanate compounds such as, for example, 2-isocyanatoethyl methacrylate (IEM) or 2-isocyanatoethyl acrylate.

Another approach to making the high equivalent weight multifunctional carbon-Michael acceptor compound is to cap a polyether polyol as described before with a polyisocyanate compound, preferably a diisocyanate. The polyisocyanate may be, for example, an aromatic polyisocyanate such as diphenylmethane diisocyanate or toluene diisocyanate, or an aliphatic polyisocyanate such as isophorone diisocyanate, hexamethylene diisocyanate, hydrogenated toluene diisocyanate, hydrogenated diphenylmethane diisocyanate, and the like. This produces a prepolymer that contains urethane groups and terminal isocyanate groups. The isocyanate groups are then capped by reaction with an isocyanate-reactive capping compound having a hydroxyl group and a (meth)acrylate group. Examples of such isocyanate-reactive capping compounds include, for example, hydroxyalkylacrylate and/or hydroxyalkylmethacrylate compounds such as hydroxyethyl acrylate and hydroxyethyl methacrylate.

A third approach to making the high equivalent weight multifunctional carbon-Michael acceptor compound is a reaction between a polyether polyol and acrylic acid, methacrylic acid, an alkyl acrylate, an alkyl methacrylate, an acrylic acid halide or a methacrylic acid halide.

In some embodiments, a mixture of the foregoing high equivalent weight multifunctional carbon-Michael acceptor compounds is present. Such a mixture may include, for example, up to 50% by weight of one or more difunctional species, and at least 50% by weight of one or more higher-functionality species. Such a mixture of high equivalent weight carbon-Michael acceptor compounds may contain 10 to 50%, preferably 15 to 40%, more preferably 15 to 35% and still more preferably 18 to 35% by weight of difunctional carbon-Michael acceptor compounds, the remainder being trifunctional or higher functionality carbon-Michael acceptor compounds.

For purposes of this invention, a "multifunctional carbon-Michael donor" is a material that contains one or more carbon-Michael donor functionalities and can react with two or more carbon-Michael acceptor functionalities to form a carbon-carbon bond to each of the carbon-Michael acceptor functionalities. Carbon-Michael donor functionalities for purposes of this invention are groups that react with the carbon-carbon double or triple bond of a carbon-Michael acceptor group to form a carbon-carbon bond to the carbon-Michael acceptor group. Suitable carbon-Michael donor functionalities have a methylene or substituted methylene (—CHR—, where R is hydrogen, hydrocarbyl or substituted hydrocarbyl) group bonded on each side to an electron-withdrawing group. The electron-withdrawing groups may be for example, carbonyl, cyano, or nitro groups. Examples of carbon-Michael donor functionalities include ß-dicarbonyl and/or ß-cyanocarbonyl moieties, i.e., moieties represented by the structures:

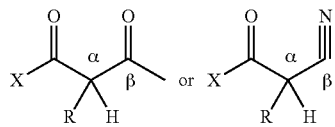

respectively, where R in each case is hydrogen, hydrocarbyl or substituted hydrocarbyl and X is hydrocarbyl, substituted hydrocarbyl or OR' where R' is hydrocarbyl or substituted hydrocarbyl. Among the suitable carbon-Michael donors having ß-dicarbonyl moieties are compounds containing one or more acetoacetate ester, acetoacetamide, and/or malonate groups. Among the suitable carbon-Michael donors having ß-cyanocarbonyl moieties are compounds containing one or more cyanoacetate ester and/or cyanoacetamide groups.

Carbon-Michael donor functionalities that include an unsubstituted methylene (—CH$_2$—) group between the electron-withdrawing groups can react difunctionally with carbon-Michael acceptor functionalities. Examples of such functionalities include ß-dicarbonyl and ß-cyanocarbonyl moieties such as those having the structures above, in which R is hydrogen. It is only necessary that one carbon-Michael donor functionality be present on the multifunctional carbon-Michael donor, when the functionality can react difunctionally, although the carbon-Michael donor may in such cases include more than one, such as 1 to 10, 1 to 6 or 1 to 4 carbon-Michael functionalities. If the carbon-Michael donor functionality is only capable of reacting with a single carbon-Michael acceptor functionality (as is the case when R is other than hydrogen in the structures above), the carbon-Michael donor needs to have at least two carbon-Michael donor functionalities per molecule. In this case, the multifunctional carbon-Michael donor may have 2 to 10, preferably 2 to 6 and more preferably 2 to 4 carbon-Michael donor functionalities per molecule.

Examples of useful multifunctional carbon-Michael donors include acetoacetate esters, cyanoacetate esters and malonic acid esters of polyhydric alcohols. The polyhydric alcohol may be, for example, one or more of ethylene glycol, 1,2- or 1,3-propane diol, 1,4-butane diol, 1,2-butanediol, 1,6-hexanediol, neopentyl glycol, 2-methyl-1,3-propane diol, diethylene glycol, triethylene glycol, dipropylene glycol, tripropylene glycol, poly(propylene glycol), poly(ethylene glycol), cyclohexanedimethanol, trimethylolpropane, triethylolpropane, pentaerythritol, glycerin, glycerol, dipentaerythritol, di-trimethylolpropane, glucose, isosorbide, butyl ethyl propanediol and the like. Acetoacetate-functional or cyanoacetate-functional polyethers, polyesters or polyesteramides are also useful.

The multifunctional carbon-Michael donor(s) may have an average equivalent weight per carbon-Michael donor functionality from 85 to 3,000 or more. This average equivalent weight may be from 100 to 1,000, from 100 to 500, or from 100 to 300.

Additional examples of useful multifunctional carbon-Michael donors include acetoacetamides and cyanoacetamides of amine compounds having two or more amine hydrogen atoms. The amine compound may be one or more of, for example, ethylene diamine, triethylene diamine, tetraethylene triamine, piperazine, isophorone diamine, hexamethylene diamine, 1,4-butane diamine, diethyltoluenediamine, phenylene diamine, various polymeric polyamines, and the like. Acetoacetamide-functional and cyanoacetamide-functional polyethers, polyesters or polyesteramides are also useful.

The amounts of carbon-Michael acceptor and carbon-Michael donor compounds preferably are selected to provide at least one mole of carbon-Michael acceptor functionalities (s) per mole of carbon-Michael donor functionalities. This ratio preferably is no greater than 3 moles of carbon-Michael acceptor functionalities per mole of carbon-Michael donor functionalities, particularly in the case in which the carbon-Michael donor reacts difunctionally with the carbon-Michael acceptor. A preferred ratio is from 1.2 to 2.5:1 moles of carbon-Michael acceptor functionalities per mole of carbon-Michael donor functionalities, and a still more preferred ratio is from 1.4 to 2.1:1.

Suitable carbon-Michael reaction catalysts include basic compounds such as described, for example, in US Published Patent Application No. 2005-0081994. Among the useful reaction catalysts include various basic and/or nucleophilic compounds such as tertiary amine compounds, amidine and guanidine compounds, quaternary ammonium hydroxides, alkali metal hydroxides, alkali metal alkoxides, alkali metal acetylacetonates, quaternary ammonium acetylacetonates, phosphines, and the like. Tertiary amine, amidine, and guanidine compounds are often preferred. Some suitable amidine and guanidine compounds include, for example, N,N,N',N'-tetramethylguanidine (TMG) and cyclic amidine compounds such as, for example, 1,8-diazabicyclo[5.4.0]undec-7-ene (DBU) and 1,5-diazabicyclo[4.3.0]non-5-ene (DBN). Among the suitable ammonium compounds are, for example, quaternary ammonium hydroxides such as, for example, tetramethyl ammonium hydroxide, tetraethyl ammonium hydroxide, tetrabutyl ammonium hydroxide, and tetraoctyl ammonium hydroxide. Some suitable amine compounds are, for example, trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl)ether, morpholine, 4,4'-(oxydi-2,1-ethanediyl)bis, triethylenediamine, pentamethyl diethylene triamine, dimethyl cyclohexyl amine, N-cetyl N,N-dimethyl amine, N-coco-morpholine, N,N-dimethyl aminomethyl N-methyl ethanol amine, N,N,N'-trimethyl-N'-hydroxyethyl bis(aminoethyl)ether, N,N-bis(3-dimethylaminopropyl)N-isopropanolamine, (N,N-dimethyl) aminoethoxy ethanol, N,N,N',N'-tetramethyl hexane diamine, N,N-dimorpholinodiethyl ether, N-methyl imidazole, dimethyl aminopropyl dipropanolamine, bis(dimethylaminopropyl)amino-2-propanol, tetramethylamino bis(propylamine), (dimethyl(aminoethoxyethyl))((dimethyl amine)ethyl)ether, tris(dimethylamino propyl)amine, dicyclohexyl methyl amine, bis(N,N-dimethyl-3-aminopropyl)amine, 1,2-ethylene piperidine and methyl-hydroxyethyl piperazine.

A catalytic amount of the carbon-Michael reaction catalyst is present during the curing step. A suitable amount is from 0.01 to 1, preferably from 0.1 to 0.5 and preferably 0.1 to 0.25 moles of carbon-Michael reaction catalyst per mole of carbon-Michael donor functionalities, although optimum amounts in any specific case may depend on the particular catalyst.

The reaction mixture also may contain optional ingredients such as one or more colorants, one or more reactive diluents, one or more flame retardants, one or more plasticizers, one or more fillers, one or more preservatives, one or more odor masks, one or more flame retardants, one or more biocides, one or more antioxidants, one or more UV stabilizers, one or more antistatic agents, one or more fibers, one or more non-fibrous particulate fillers (including micron- and nano-particles), one or more wetting agents and the like.

The reaction mixture preferably is substantially free of manganese dioxide, thiram and isocyanate compounds. Such compounds, if present at all, preferably constitute at most 1%, more preferably at most 0.25%, of the weight of the reaction mixture. Most preferably the reaction mixture contains no measurable amount of any of these compounds.

Another optional component is one or more low equivalent weight carbon-Michael acceptor compounds. Such compound(s) have two or more (preferably 2 to 6 or 2 to 4) carbon-Michael acceptor groups as described before and may have, for example, an equivalent weight per carbon-Michael acceptor group of up to about 450, preferably up to about 250. Such low equivalent weight carbon-Michael acceptor compounds can be produced, for example, by capping the hydroxyl groups of a low (up to 125, preferably up to 75) equivalent weight polyol with (i) a (meth)acrylate-functional isocyanate compound such as 2-isocyanatoethyl methacrylate (IEM) or 2-isocyanatoethyl acrylate, or (ii) acrylic acid, methacrylic acid, an alkyl acrylate, an alkyl methacrylate, an acrylic acid halide or a methacrylic acid halide. Low equivalent weight carbon-Michael acceptor compounds also can be produced by capping a polyisocyanate, preferably a diisocyanate, with an isocyanate-reactive capping compound having a hydroxyl group and a (meth)acrylate group as described before.

This low equivalent weight carbon-Michael acceptor compound or compounds, if present, may constitute up to 75%, up to 50%, up to 25%, up to 15%, up to 10% or up to 5% of the total weight of all multifunctional carbon-Michael acceptor compounds provided to the reaction mixture.

In some embodiments of the invention, mixtures of high and low equivalent weight carbon-Michael acceptor compounds can be produced by (1) reacting an excess of a polyisocyanate with a polyether polyol, optionally in the presence of a low (i.e., up to about 125) equivalent weight polyol, to form a quasi-prepolymer containing isocyanate terminated polyether compounds and unreacted polyisocyanates and then (2) capping the isocyanate groups with an isocyanate-reactive capping compound having a hydroxyl group and an acrylate or methacrylate group as described before. This caps the prepolymer molecules and the remaining unreacted polyisocyanate compounds to produce a mixture of high and low equivalent weight carbon-Michael acceptor compounds.

The following examples are intended to illustrate the invention, but not to limit the scope thereof. All parts and percentages are by weight unless otherwise indicated.

EXAMPLE 1

590.21 parts of a 1000 equivalent weight nominally difunctional poly(propylene oxide) and 16 parts of diethylene glycol are charged to a vessel purged with nitrogen. 193.78 parts of an 80/20 by weight mixture of the 2,4' and the 2,6' isomers of toluene diisocyanate are added. The components are stirred briefly, and then allowed to react for three hours at 80° C. under nitrogen to produce an isocyanate-terminated prepolymer having an isocyanate content of about 7% by weight.

300 parts of the foregoing prepolymer are added under nitrogen into the cup of a high-speed laboratory mixer, followed by 60.7 parts of hydroxyethyl acrylate and 0.21 parts of dibutyltin dilaurate. The components are mixed for 90 seconds while maintaining their temperature at or below 30° C. The mixed components are then allowed to sit at room temperature until the reaction is completed, as indicated by disappearance of the NCO peak by IR spectroscopy.

An elastomer (Example 1) is prepared by adding the resulting acrylate-terminated polyether (52.21 parts), trimethylolpropane trisacetoacetate (4.64 parts) and 0.1779 parts 1,8-diazabicycloundec-7-ene into the cup of a high-speed laboratory mixture. The components are mixed at high speed for about one minute.

100 grams of the mixed components are placed into a nearly adiabatic holder with a lid and thermocouple assembly. The temperature profile is recorded until the temperature cools back down to room temperature (—23° C.). Gel time is indicated by the time to peak exotherm.

A second portion of the mixed components is poured into a plaque mold and allowed to cure at room temperature for two days. Tensile strength and elongation are measured per ASTM D1708. Shore A hardness is measured using a durometer.

A 2 inch×2 inch (5 cm×5 cm) section of the cured plaque is immersed in deionized water and heated at 70° C. for two weeks. The sample is then dried and its mass gain is measured.

Results of this testing are as indicated in Table 1 below.

Example 2 is made by combining 273 parts of a 500 equivalent weight, nominally trifunctional poly(propylene oxide) and 18 parts of diethylene glycol in a vessel purged with nitrogen. 118.9 parts of an 80/20 by weight mixture of the 2,4'- and the 2,6'-isomers of toluene diisocyanate are added. The components are stirred briefly, and then allowed to react for three hours at 80° C. under nitrogen to produce an isocyanate-terminated prepolymer having an isocyanate content of about 6.9% by weight. 325 parts of the foregoing prepolymer are added under nitrogen into the cup of a high-speed laboratory mixer, followed by 64.86 parts of hydroxyethyl acrylate and 0.39 parts of dibutyltin dilaurate. The components are mixed for 90 seconds while maintaining their temperature at or below 30° C. The mixed components are then allowed to sit at room temperature until the reaction is completed, as indicated by disappearance of the NCO peak by IR spectroscopy. Elastomer Example 2 is prepared by adding the resulting acrylate-terminated polyether (27.19 parts), trimethylolpropane trisacetoacetate (2.45 parts) and 0.06 parts 1,8-diazabicycloundec-7-ene into the cup of a high-speed laboratory mixture. The components are mixed at high speed for about one minute. Elastomer Example 2 is evaluated in the same manner as Example 1, with results as indicated in Table 1.

Elastomer Example 3 is made by combining 295.3 parts of a 1000 equivalent weight nominally trifunctional poly(propylene oxide) and 8 parts of diethylene glycol in a vessel purged with nitrogen. 96.89 parts of an 80/20 by weight mixture of the 2,4'- and the 2,6'-isomers of toluene diisocyanate are added. The components are stirred briefly, and then allowed to react for three hours at 80° C. under nitrogen to produce an isocyanate-terminated prepolymer having an isocyanate content of about 7% by weight. 318 parts of the foregoing prepolymer are added under nitrogen into the cup of a high-speed laboratory mixer, followed by 63.6 parts of hydroxyethyl acrylate and 0.19 parts of dibutyltin dilaurate. The components are mixed for 90 seconds while maintaining their temperature at or below 30° C. The mixed components are then allowed to sit at room temperature until the reaction is completed, as indicated by disappearance of the NCO peak by IR spectroscopy. Elastomer Example 3 is prepared by adding the resulting acrylate-terminated polyether (15.97 parts), ditrimethylolpropane tetraacrylate (marketed by Sartomer Corporation as SR355, 8.34 parts) and 0.32 parts 1,8-diazabicycloundec-7-ene into the cup of a high-speed laboratory mixture. The components are mixed at high speed for about one minute, and then evaluated as before. Results are as indicated in Table 1.

TABLE 1

| Test | Example 1 | Example 2 | Example 3 |
| --- | --- | --- | --- |
| Peak Exotherm Temperature | 45-50° C. | 45-50° C. | 115° C. |
| Gel Time | 15-30 minutes | 15-30 minutes | 15-30 minutes |
| Tensile Strength | 4.6 MPa (660 psi) | 11.8 MPa (1709 psi) | 8.0 MPa (1165 psi) |
| Elongation | 133% | 148% | 132% |
| Hardness | 70 Shore A | 84 Shore A | 88 Shore A |
| Water absorption, % by weight | 15% | 6% | 6% |
| $T_g$ ° C. (DSC) | Two discrete glass transitions at −51, 90° C. | Broad glass transition from −30 to +20° C. | Two discrete transitions at −53° C., +38° C. |
| Weight loss | 3.5% | 6.9% | 7.1% |
| Appearance | Opaque, elastic | Transparent, viscoelastic | Opaque, elastic |

The properties reported in Table 1 indicate that each of Examples 1-3 is suitable for use as a polymeric insulating sheath for cable joining applications as described herein.

What is claimed is:

1. A method for making a cable joint, comprising the steps of:
    a) providing a first cable having polymeric insulation and a first bare conductor end and a second cable having polymeric insulation and a second bare conductor end,
    b) joining the first bare conductor end of the first cable to the second bare conductor end of the second cable to create a conductor joint,
    c) providing a curable reaction mixture, wherein the curable reaction mixture contains a mixture of 1) at least one multifunctional carbon-Michael acceptor compound, wherein at least one of such multifunctional carbon-Michael acceptor compounds contains two or more carbon-Michael acceptor groups, of which at least one is separated from each of the other carbon-Michael acceptor groups by an aliphatic polyether group having a molecular weight of at least 800 atomic mass units, 2) at least one multifunctional carbon-Michael donor compound and 3) at least one carbon-Michael reaction catalyst,
    d) applying the curable reaction mixture over the conductor joint and in contact with the polymeric insulation of the first cable and the polymeric insulation of the second cable and
    e) curing the curable reaction mixture to form a polymeric insulating sheath over the conductor joint and bonded to the polymeric insulation of each of the first and second cables.

2. The process of claim 1, wherein the aliphatic polyether group has a molecular weight of at least 1000 atomic mass units.

3. The process of claim 2, wherein the carbon-Michael acceptor groups are activated alkene groups having an aliphatic carbon-carbon double or triple bond alpha to a carbonyl or nitro group.

4. The process of claim 3, wherein the carbon-Michael acceptor groups are acrylate or methacrylate groups.

5. The process of claim 3, wherein the carbon-Michael donor compound has an equivalent weight per carbon-Michael donor functionality of 100 to 1000.

6. The process of claim 3, wherein the carbon-Michael donor compound contains one or more ß-dicarbonyl and/or ß-cyanocarbonyl moieties.

7. The process of claim 6, wherein the carbon-Michael donor compound contains one or more ß-dicarbonyl moieties.

8. The process of claim 3, wherein the catalyst includes at least one tertiary amine, amidine, quaternary ammonium hydroxide, alkali metal hydroxide, alkali metal alkoxide, alkali metal acetylacetonate or quaternary ammonium acetylacetonate.

9. The process of claim 8, wherein the catalyst includes at least one cyclic amidine catalyst.

10. The process of claim 3, wherein the curable reaction mixture further contains at least one carbon-Michael acceptor compound having an equivalent weight per carbon-Michael acceptor group of up to 250.

11. The process of claim 10, wherein step c) further comprises a step of forming the reaction mixture at a temperature of 10 to 30° C.

12. The process of claim 3, wherein step c) further comprises a step of forming the reaction mixture at a temperature of −10° C. to 50° C. and step e) includes a step of curing the reaction mixture without applying additional heat to the reaction mixture.

13. The process of claim 3, wherein step d) further comprises a step of disposing the conductor joint within a mold adapted to fit over the cable conductor joint and introducing the reaction mixture into the mold, and step e) is performed in the mold.

\* \* \* \* \*